US012713092B2

(12) United States Patent
Huddar et al.

(10) Patent No.: US 12,713,092 B2
(45) Date of Patent: Aug. 18, 2026

(54) 4K CONTENT MEMORY FRAGMENTATION VIEWING COUNTERMEASURES

(71) Applicant: DISH Network Technologies India Private Limited, Bengaluru (IN)

(72) Inventors: Lohit Huddar, Bengaluru (IN); Kaustubh Dandekar, Nagpur (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 0 days.

(21) Appl. No.: 18/601,798

(22) Filed: Mar. 11, 2024

(65) Prior Publication Data

US 2025/0287066 A1 Sep. 11, 2025

(51) Int. Cl.
*H04N 21/44* (2011.01)
*H04N 21/442* (2011.01)

(52) U.S. Cl.
CPC . *H04N 21/44004* (2013.01); *H04N 21/44209* (2013.01)

(58) Field of Classification Search
None
See application file for complete search history.

(56) References Cited

U.S. PATENT DOCUMENTS

2012/0114302 A1* 5/2012 Randall .................... H04N 9/87 386/E9.011
2018/0027039 A1* 1/2018 Moorthy ............ H04N 21/2402 709/219
2023/0028941 A1* 1/2023 Gavino ................. H04L 47/215

* cited by examiner

*Primary Examiner* — Heather R Jones
(74) *Attorney, Agent, or Firm* — Kilpatrick Townsend & Stockton LLP

(57) ABSTRACT

A method may include receiving, by a playback module of a computing system, a trigger to increase a resolution of media to be displayed from a first resolution to a second resolution. The method may include determining, by the playback module of the computing system, a minimum buffer associated with the second resolution. The method may include transmitting, by the playback module of the computing system, a buffer query to a hardware module of the computing system, the buffer query indicating the minimum buffer. The method may include receiving, by the playback module of the computing system, a buffer response from the hardware module of the computing system, the buffer response indicating whether the minimum buffer is available. The method may include causing, by the playback module of the computing system, the media to be displayed at the second resolution.

20 Claims, 6 Drawing Sheets

4K CONTENT MEMORY FRAGMENTATION VIEWING COUNTERMEASURES

BACKGROUND

Streaming media via a network to a computing system or device requires a certain amount of bandwidth from the network in order to transmit the media to the computing system. The computing system must also have the resources to play the media at any given resolution. As resolutions have increased, the resources needed to satisfactorily play the media on the computing system. The increased resolutions have caused some computing systems to fragment the media, leading to errors in playback.

BRIEF SUMMARY

A method may include receiving, by a playback module of a computing system, a trigger to increase a resolution of media to be displayed from a first resolution to a second resolution. The method may include determining, by the playback module of the computing system, a minimum buffer associated with the second resolution. The method may include transmitting, by the playback module of the computing system, a buffer query to a hardware module of the computing system, the buffer query indicating the minimum buffer. The method may include receiving, by the playback module of the computing system, a buffer response from the hardware module of the computing system, the buffer response indicating whether the minimum buffer is available. In response to the buffer response indicating that the minimum buffer is available, the method may include causing, by the playback module of the computing system, the media to be displayed at the second resolution.

In some embodiments, in response to the buffer response indicating that the minimum buffer is unavailable, the method may include causing, by the playback module of the computing system, the media to be displayed at the first resolution. The first resolution may be at least one of 1080p or 720p, and the second resolution may be 4k. The minimum buffer corresponds to at least one continuous block of random access memory. The buffer query is transmitted to the hardware module of the computing system using an application programming interface.

In some embodiments, the method may include determining, by the computing system, a first bandwidth for wireless communications via a wireless network. The method may include detecting, by the computing system, an increase in the first bandwidth for wireless communications to a second bandwidth. The method may include determining, by the playback module of the computing system, that the second bandwidth is above a certain threshold such that the media may be displayed at the second resolution. The computing system may transmit the buffer request in response to determining that the second bandwidth is above the certain threshold. The trigger may include a change in bandwidth available to the computing system via a network. In some embodiments, the method may include in response to the buffer response indicating that the minimum buffer is available, receiving, from the hardware module of the computing system, a location of a continuous block of memory within a computer-readable memory corresponding to the minimum buffer. The method may include causing, by the playback module, data associated with the media to be stored in at least a portion of the continuous block of memory.

A system may include one or more processors, a hardware module configured to access data indicating a status of one or more hardware components of the system, a playback module, configured to cause media to be displayed by the system, and a non-transitory computer-readable medium may include instructions. When executed by the one or more processors, the instructions may cause the system to perform operations. According to the operations, the system may receive, by the playback module, a trigger to increase a resolution of media to be displayed from a first resolution to a second resolution. The system may determine, by the playback module, a minimum buffer associated with the second resolution. The system may transmit, by the playback module, a buffer query to the hardware module, the buffer query indicating the minimum buffer; receive, by the playback module, a buffer response from the hardware module of the computing system, the buffer response indicating whether the minimum buffer is available. In response to the buffer response indicating that the minimum buffer is available, the system may cause, by the playback module, the media to be displayed at the second resolution.

In some embodiments, the first resolution may be at least one of 1080p or 720p, and the second resolution may be 4k. The buffer query may include respective buffer sizes associated with at least one of the first resolution or the second resolution. The first resolution may be determined at least in part by an available bandwidth of a network. The system may further perform operations to determine a first bandwidth for wireless communications via a wireless network. The system may detect an increase in the first bandwidth for wireless communications to a second bandwidth. The system may determine, by the playback module, that the second bandwidth is above a certain threshold such that the media may be displayed at the second resolution. The playback module may transmit the buffer query in response to determining that the second bandwidth is above the certain threshold.

A non-transitory computer-readable medium may include instructions that, when executed by one or more processors, cause the one or more processors to perform operations. The operations may include receiving, by a playback module of a computing system, a trigger to increase a resolution of media to be displayed from a first resolution to a second resolution. The operations may include determining, by the playback module of the computing system, a minimum buffer associated with the second resolution. The operations may include transmitting, by the playback module of the computing system, a buffer query to a hardware module of the computing system, the buffer query indicating the minimum buffer. The operations may include receiving, by the playback module of the computing system, a buffer response from the hardware module of the computing system, the buffer response indicating whether the minimum buffer is available. The operations may include, in response to the buffer response indicating that the minimum buffer is available, causing, by the playback module of the computing system, the media to be displayed at the second resolution.

In some embodiments, the minimum buffer corresponds to a plurality of continuous blocks of random access memory. The buffer query may be transmitted to the hardware module of the computing system using an application programming interface. The operations may include determining, by the computing system, a first bandwidth for wireless communications via a wireless network. The operations may include detecting, by the computing system, an increase in the first bandwidth for wireless communications to a second bandwidth. The operations may include determining, by the playback module of the computing system, that the second bandwidth is above a certain threshold such that the media may be displayed at the second resolution.

In some embodiments, the operations may include, in response to the buffer response indicating that the minimum buffer is available, receiving, from the hardware module of the computing system, a location of a continuous block of memory within a computer-readable memory corresponding to the minimum buffer. The operations may include causing, by the playback module, data associated with the media to be stored in at least a portion of the continuous block of memory.

DETAILED DESCRIPTION

Figure 1:
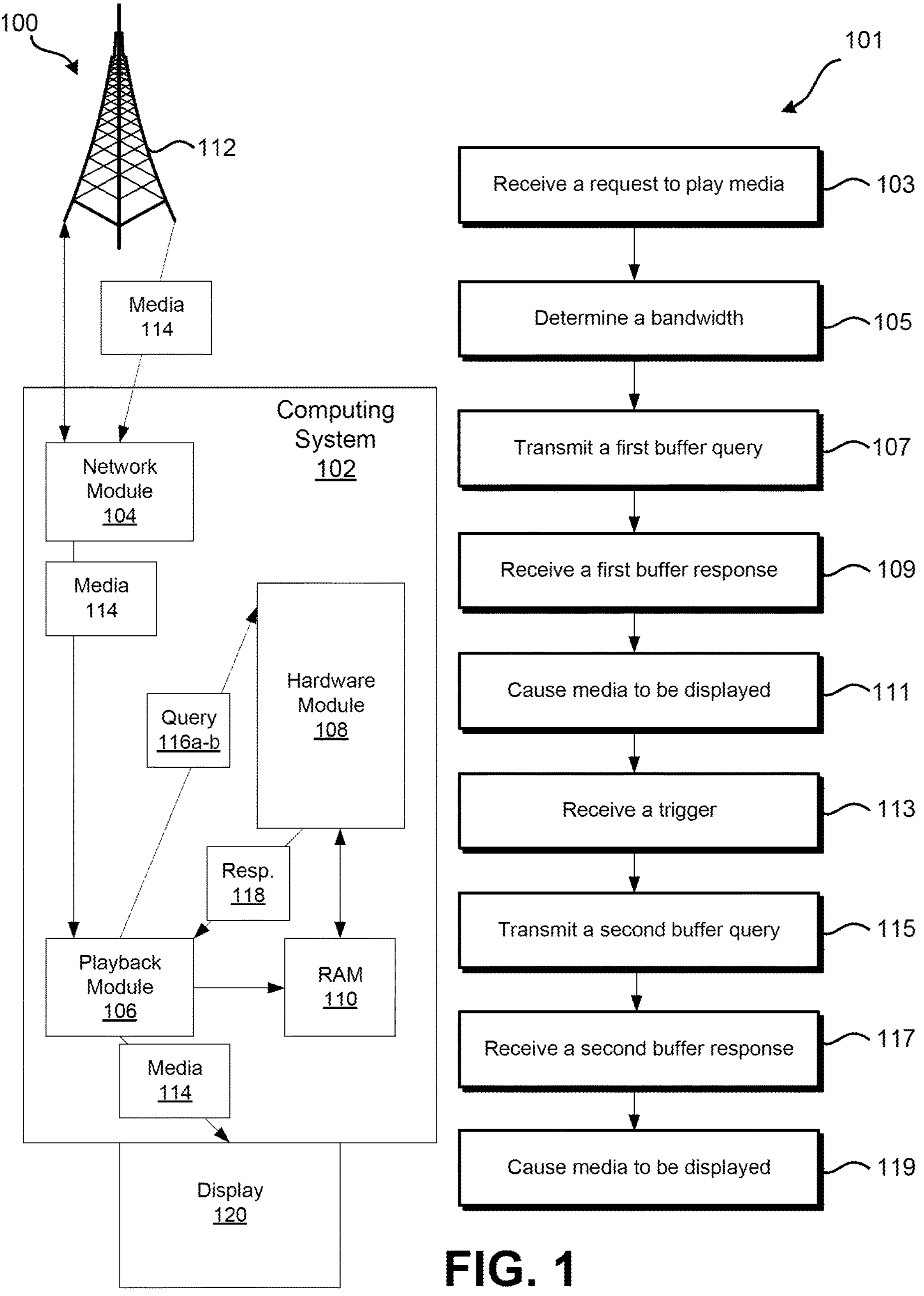
FIG. 1 illustrates a system and a process for reducing memory fragmentation during media playback, according to certain embodiments.

Streaming video has become a popular way to consume media. As the resolution of displays has increased, the file size of video has also increased. The increased file size associated with high resolution media (e.g., video) may require higher bandwidth to deliver the media to a computing system or device. Some wireless networks may provide enough bandwidth to deliver the appropriate files needed to play the media at a high resolution (e.g., 4K, 1080p, etc.). Furthermore, the computing system itself may also utilize more hardware resources to properly play back the media. For example, in order to protect against frame drop, video fragmentation, and other undesirable effects, the computing system may have an in-memory buffer. The in-memory buffer may be allocated to store some or all of the media in order to render the media at the desired resolution. However, even within the same wireless network, the network bandwidth available to a particular device may rise and fall depending on network conditions, location, user volume, and other such factors. Thus, when a user is playing the media at one resolution, a change in bandwidth may make a higher resolution possible. The computing system, however, may not be able to provide the resources needed in order to play the media at the higher resolution.

For example, a computing system connected to a network may request media to be streamed and displayed by the computing system and/or by a different display. The request may include a request to play the media at the highest possible resolution. The computing system may request the media to be downloaded according to the highest possible resolution, but the bandwidth of the network may be too low to permit streaming the media at the requested resolution. The computing system may then select the highest available resolution and allocate resources such as an in-memory buffer and/or processor resources according to the highest available resolution. After receiving the media via the network, the computing system may play the media at the highest possible resolution.

At some point later, the computing system may detect that the network (or a different network) has enough bandwidth to play at the highest possible resolution. However, because the computing system allocated resources for the highest available resolution, the computing system may not be able to display the media at the highest possible resolution. For example, the highest available resolution may only require a continuous buffer of 6 MB. The highest possible resolution may require a continuous buffer of 21 MB. If the computing system attempted to play the media at the highest possible resolution, the media may appear to freeze, drop video frames, audio, and have other undesired effects. Thus, even if a change in the bandwidth enables a switch from one resolution to a higher resolution, there may be significant problems when trying to display the media at the higher resolution.

One solution to this problem may be to query the computing system in order to detect available continuous blocks of memory before displaying media at a higher resolution. A computing system (sometimes "computing device") may receive a request (e.g., a user input) to stream media such as a video. The computing system may be configured to process and render the media in any number of resolutions (e.g., 720p, 1080p, 4K, 8K, etc.). The computing system may determine that a wireless connection to a wireless network has a bandwidth capable of supporting streaming a first resolution (e.g., 1080p). A playback module of the computing system may then request a graphics buffer associated with the first resolution (e.g., 3 continuous blocks of RAM, where each block is 6 MB) from a hardware module of the computing system. The hardware module may then determine a total amount of memory available and a total amount of continuous blocks available. If the hardware module determines that the requested memory is available-both the total amount of memory and the continuous blocks—the hardware module may cause the graphics buffer to be allocated within the RAM. The hardware module may then provide a response to the playback module indicating the location of the memory to be used as the graphics buffer. The playback module may then receive data associated with the media from the network, cause at least a portion of the data to be stored in the graphics buffer, and cause the media to be displayed (either on an on-board display or some other display).

Later, the computing system may detect that the bandwidth provided by the wireless connection has increased such that the media may be streamed at a second resolution (e.g., 4K). Before requesting the media via the network, the playback module may transmit a second request for the graphics buffer to the hardware module, indicating an amount of total memory and continuous blocks thereof associated with the second resolution (e.g., 84 MB total memory, in continuous blocks of 21 MB). The hardware module may then determine the total amount of available memory and the amount of the available memory that is in continuous blocks. If the hardware module determines that the computing system has the memory available to fulfil the second request for the graphics buffer, the hardware module may allocate the memory within the RAM for the graphics buffer. The hardware module may then transmit a response to the playback module indicating the updated location(s) of the graphics buffer. The playback module may then request the media at the second resolution via the network. Upon receiving data associated with the media, the playback module may cause at least a portion of the data to be stored in the graphics buffer and cause the media to be displayed (either on an on-board display or some other display). If, by contrast, the hardware module determines that the requested graphics buffer is unavailable, the hardware module may transmit a response to the playback module indicating that the requested graphics buffer is unavailable. The playback module may then continue causing the media to be displayed at the first resolution.

FIG. 1 illustrates a system 100 and a process 101 for reducing memory fragmentation during media playback, according to certain embodiments. The system 100 may include a computing system 102. The computing system 102 may include a network module 104, a playback module 106, a hardware module 108, RAM 110, and a display 120. The computing system 102 may be a unitary device, such as a mobile phone tablet, laptop, etc. Alternatively, some of the components of the computing system 102 may be separate from other components. For example, the display 120 may be a monitor, display, or other computing device, connected to the computing system 102 via a wired or wireless connection (e.g., Wi-Fi, Bluetooth, etc.).

The network module 104 may include one or more hardware and/or software components. The network module 104 may be configured to communicate with one or more networks such as cellular network (e.g., 3G, 4G, 5G, etc.), Wi-Fi, a wired connection, or any other suitable network. The network module 104 may transmit and receive communications from a network (e.g., a network 112) and/or other components of the computing system 102. The network module 104 may also be configured to determine one or more properties associated with the network, such as available bandwidth, signal strength, and other properties.

The playback module 106 may include hardware and/or software components and be configured to render and display media via components of the computing system 102. The playback module 106 may enable the media to be displayed at one or more resolutions, such as 720p, 1080p, 4K, 8K, and any other resolution. The playback module 106 may determine the one or more possible resolutions based on the particular components of the computing system 102 and/or the components thereof. For example, the display 120 may only be capable of displaying the media at resolutions of 1080p or lower. In that case, the playback module 106 may only be configured to process media at resolutions of 1080p or lower. In other examples, the playback module 106 may be configured to process media at any or all resolutions regardless of the capabilities of the computing system 102 and/or the components thereof.

The hardware module 108 may be configured to determine one or more properties of the computing system 102. The hardware module 108 may include one or more software and/or hardware components. In some embodiments, the hardware module 108 may be included in an operating system of the computing system 102. The hardware module 108 may monitor various components of the computing system 102 continuously during operation and/or may determine properties of the various components in response to a request. The hardware module 108 may also be configured to cause the properties of the various components. For example, the hardware module 108 may cause memory (e.g., the RAM 110) to be allocated to tasks being performed by the computing system 102. The hardware module 108 may also be configured to cause processor time to be allocated to the tasks being performed by the computing system.

The RAM 110 may be a single memory chip within the computing system 102 or may be multiple memory chips. In some embodiments, the RAM 110 may be dedicated to a specific purpose, such as graphics processing. In other embodiments, portions the RAM 110 may be allocated (e.g., by the hardware module 108) to the specific purpose(s). The RAM 110 may be static RAM (SRAM), dynamic RAM (DRAM), LPDDR4, LPDDR4x, and any other suitable memory type. The RAM 110 may have a total amount of memory (e.g., 8 GB, 16 GB, 32 GB, etc.) divided into logical and/or physical blocks. Each of the blocks may include a plurality of bits, identifiable by addresses indicating the location of one or more of the plurality of bits. Each block may therefore be identified by a series of corresponding addresses. The blocks themselves may be of any size. For example, a first block may include 4 MB of unused bits and be indicated by a series of addresses corresponding to the unused bits. A second block may include 4 MB of bits in use (e.g., unavailable bits) and be indicated by a series of addresses corresponding to the unavailable bits. The display 120 may include a screen integrated into the computing system 102 (e.g., the screen of a mobile device) or may be a display connected to the computing system 102 (e.g., a monitor connected to a set top box or other such device). The display 120 may be configured to display media at a maximum resolution (e.g., 8K).

At step 103, the computing system 102 may receive a request to play media 114. The request may be a user request to stream the media 114 via the network 112. The request may be received via the playback module 106 and/or may be transmitted to the playback module 106 via another component of the computing system 102, such as the operating system. The request may include a desired resolution. The desired resolution may be the maximum resolution of the display 120 or may be a preset resolution based on a predetermined setting.

At step 105, the network module 104 may determine a bandwidth available to the computing system 102 via the network 112. The network module 104 may determine the bandwidth based on the request to play the media 114. For example, the request to play the media 114 may trigger the network module 104 to determine the available bandwidth. The network module 104 may then indicate the available bandwidth to the playback module 106. The playback module 106 may then determine a first resolution based on the available bandwidth. In other embodiments, the playback module 106 may query the network module 104 for the available bandwidth, indicating a bandwidth associated with the desired resolution. The network module 104 may then respond with the available bandwidth, and/or indicate that the desired resolution may be supported by the available bandwidth. In other examples, the network module 104 may respond with an available bandwidth less than that associated with the desired bandwidth. The playback module 106 may then determine the first resolution based on the available bandwidth.

At step 107, the playback module 106 may transmit a first buffer query **116*a* to the hardware module. The playback module 106 may transmit the first buffer query 116*a* to the hardware module 108 via an application programming interface (API). The first buffer query 116*a* may indicate a total amount of memory and/or continuous blocks of memory associated with the first resolution. For example, the first resolution may be 1080p. The playback module 106 may determine an amount of the media 114 (e.g., 2 seconds of playback, 3 seconds, etc.) to be buffered in order to display the media 114 properly. The playback module 106 may then determine that the amount of media 114 to be buffered at 1080p is 24 MB of memory in 6 MB continuous blocks (e.g., 8 seconds of buffered media 114). The first buffer query 116***a* may then indicate a request for 24 MB of the RAM 110 in 6 MB continuous blocks.

In other embodiments, the first buffer query 116*a* may indicate multiple buffer sizes. For example, the playback module 106 may determine that the available bandwidth may only support 1080p, but that other components of the computing system 102 are generally able to support a higher resolution (e.g., 4K). The first buffer query 116*a* may then indicate the various buffer sizes. For example, the playback module 106 may determine that the amount of the media 114 to be buffered at the higher resolution is 84 MB of memory in 21 MB continuous blocks (e.g., 8 seconds of the media 114). The buffer query 116 may then indicate a request for 84 MB in 21 MB continuous blocks. The buffer query 116 may also indicate a secondary request for the buffer size associated with the first resolution, and/or other buffer sizes associated with other resolutions. The hardware module 108 may then iteratively process the requests included in the first buffer query 116*a* until a buffer size is found that is available within the RAM 110. In any case, the hardware module 108 may then cause the RAM 110 to allocate continuous blocks of memory to fulfil the first buffer query 116*a*. In some embodiments, the hardware module 108 may also query one or more processors of the computing system 102 to determine a capacity needed to allocate the amount of RAM 110 needed for the buffer.

At step 109, the playback module 106 may receive a buffer response 118 from the hardware module 108. The buffer response 118 may indicate that the indicated amount of memory for the first resolution has been allocated within the RAM 110. The buffer response 118 may also include the addresses indicating the location of the allocated memory (now, the "graphics buffer"). In embodiments where the first buffer query 116*a* indicates multiple buffer sizes, the buffer response 118 may also indicate the size of the graphics buffer. For example, the hardware module 108 may determine that the buffer size associated with the first resolution is unavailable, but that a graphics buffer has been allocated at some other resolution (e.g., 720p using 12 MB of 3 MB continuous blocks). In another example, the buffer response 118 may indicate that the graphics buffer includes a total amount of memory in the appropriate blocks to support a higher resolution than the first resolution (e.g., 84 MB in 21 MB continuous blocks). Then, the playback module 106 may store that information for later use.

At step 111, the playback module 106 may cause the media 114 to be displayed by the display 120 at the first resolution (provided that the graphics buffer is of an adequate size). To do so, the playback module 106 may request some or all of the data associated with the media 114 via the network 112. The network module 104 may receive and transmit the data to the playback module 106. The playback module 106 may store some or all of the data in the graphics buffer within the RAM 110. The playback module 106 may then render the data and cause the media 114 to be displayed on the display 120.

At step 113, the playback module 106 may receive a trigger to increase the resolution of the media 114 from the first resolution to a higher, second resolution (e.g., 1080p to 4K). The trigger may include an increase in the available bandwidth of the network 112. For example, the computing system 102 may have initiated the playback of the media 114 in a first area, where the bandwidth of the network 112 is limited (e.g., a rural area). At some point during the playback of the media 114, the computing system 102 may travel to a second area with more available bandwidth (e.g., and urban environment). The network module 104 may detect this increase in available bandwidth and notify the playback module 106 of the increase. The playback module 106 may then determine that the new available bandwidth is sufficient to support the second resolution. In other embodiments, the trigger may include a user input, an alert from other components of the computing system 102, or any other suitable trigger.

At 115, the playback module 106 may transmit a second buffer query to the hardware module. The second buffer query 116*b* may be similar to the first buffer query 116*a* and indicate one or more buffer sizes including a buffer size associated with the second resolution (e.g., 84 MB in 21 MB continuous blocks). In other embodiments, the first buffer response 118*a* may have indicated that the buffer size associated with the second resolution was previously allocated. Then, the playback module 106 may cause the media 114 to be displayed at the second resolution by the display 120, as described above in relation to the first resolution.

At 117, the playback module 106 may receive a second buffer response 118*b*. The second buffer response 118*b* may indicate that the RAM 110 has the buffer size associated with the second resolution available and/or that the graphics buffer has been updated such that the graphics buffer has been allocated. The second buffer response 118*b* may also indicate addresses of blocks within the updated graphics buffer.

If the second buffer response 118*b* indicates that the graphics buffer has been updated, at step 119, the playback module 106 may cause the media 114 to be displayed at the second resolution by the display 120. The playback module 106 may request data associated with the media 114 at the second resolution from the network 112 via the network module 104. Upon receiving the data, the playback module 106 may cause some or all of the data in the graphics buffer within the RAM 110, and cause the display 120 to playback the media 114 at the second resolution. If the second buffer response 118*b* indicates that the graphics buffer may not be increased, the playback module 106 may continue to cause the media 114 to be displayed according to the first resolution.

Figure 2:
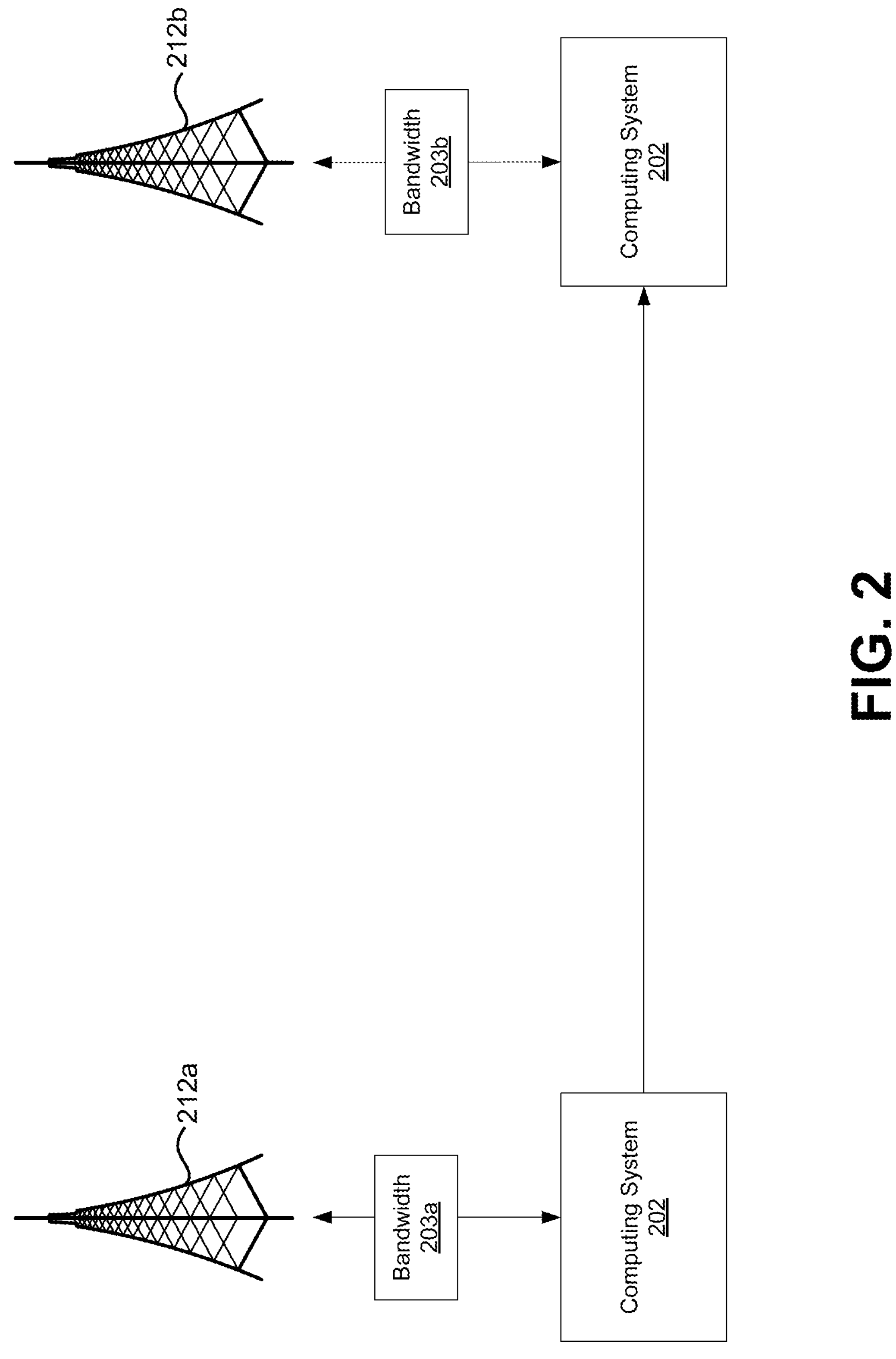
FIG. 2 illustrates a system including a computing system and networks, according to certain embodiments.

FIG. 2 illustrates a system 200 including a computing system 202 and networks 212*a-b*, according to certain embodiments. The computing system 202 may be similar to the computing system 102 in FIG. 1 and include similar components and functionalities. The networks 212*a-b* may be a wireless network such as a cellular network (e.g., 3G, 4G, 5G, etc.), Wi-Fi, or other such network. The networks 212*a-b* may be a single network administered by a single network provider. In that case, the first network 212*a* may represent a first connection in a first area (e.g., a rural area). The second network 212*b* may represent a second connection in a second area (e.g., an urban area). In other embodiments, the networks 212*a-b* may be different networks. For example, the first network 212*a* may be associated with a first network provider. The computing system 202 may be roaming utilizing the first network 212*a* or may be connected to the first network 212*a* by some other arrangement with a second network provider. The second network 212*b* may then be associated with the second network provider. Other possibilities and configurations are readily apparent.

The computing system 202 may receive a request to stream media while connected to the first network 212*a*. The computing system 202 may determine that a bandwidth 203*a* is available via the network 212*a*. The bandwidth 203*a* may be sufficient to provide the requested media at a first resolution, but not at a higher resolution. For example, the bandwidth 203*a* may be sufficient to support display of the requested media at 720p, but at no higher resolutions. Thus, using some or all of a process similar to the process 101 in FIG. 1, the computing system 202 may then begin to display the requested media at the first resolution (e.g., 720p).

During playback of the requested media, the computing system 202 may then connect to the second network 212*b*. The computing system 202 may determine that a bandwidth 203*b* is available via the second network 212*b*. For example, the computing system 202 may be on a train or some other mode of transportation. The computing system 202 may therefore travel within range of the second network 212*b*. In another example, the networks 212*a-b* may be the same network in the same location. Then, the second network 212*b* may represent an increase in available bandwidth from the bandwidth 203*a* to the bandwidth 203*b* due to changes in the networks 212*a-b*, the computing system 202 (e.g., another process began using less bandwidth than previously), or any other reason. The computing system 202 may then determine that the bandwidth 203*b* is sufficient to support a second resolution, higher than the first resolution (e.g., 1080p, 4K, 8K, etc.).

Figure 3:
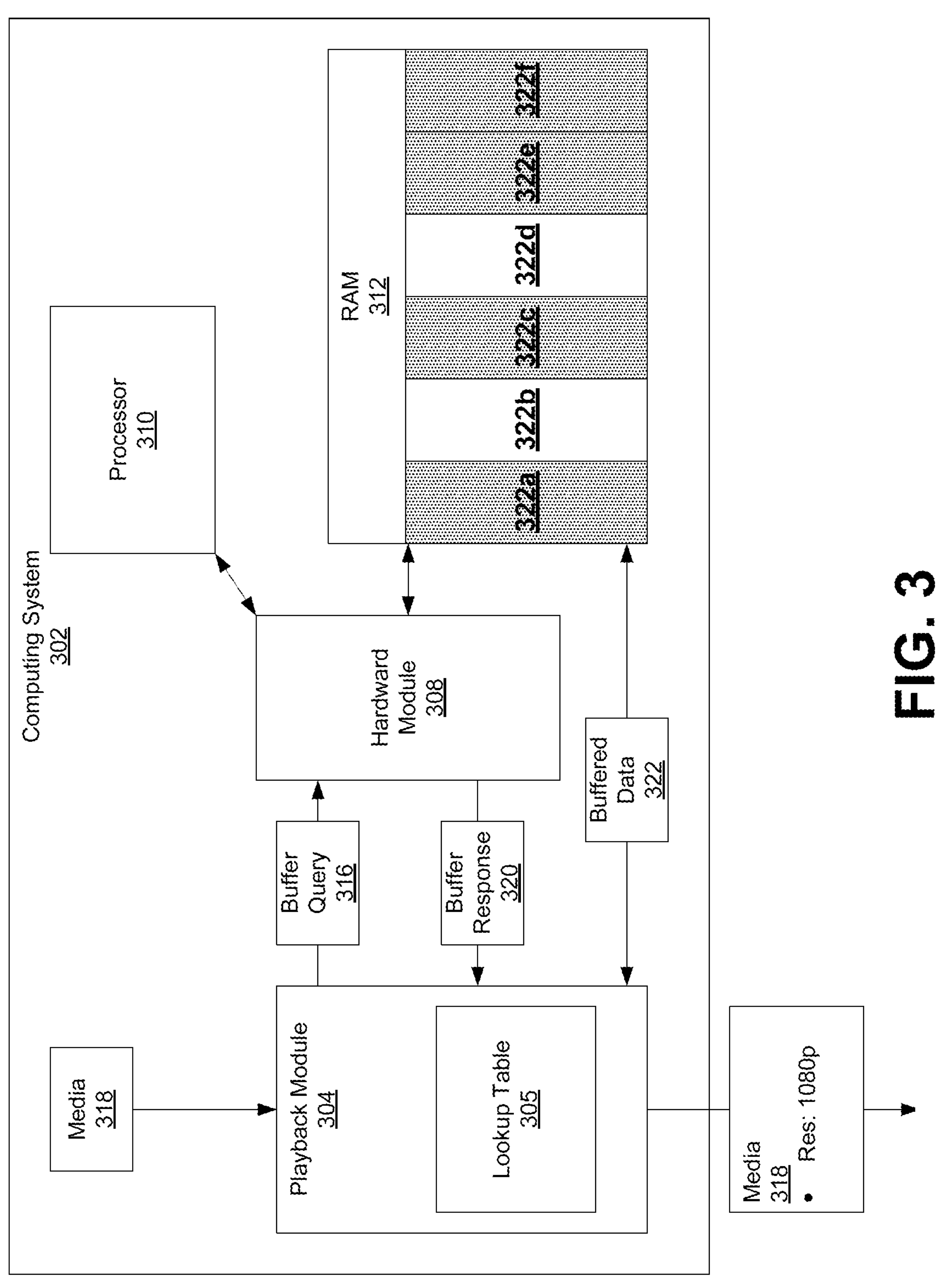
FIG. 3 illustrates a system for reducing memory fragmentation during media playback, according to certain embodiments.

FIG. 3 illustrates a system 300 for reducing memory fragmentation during media playback, according to certain embodiments. The system 300 may be similar to some or all of the system 100 in FIG. 1 and/or the system 200 in FIG. 2. The system 300 may include a computing system 302. The computing system 302 may include a playback module 304, a hardware module 308, a processor(s) 310, and RAM 312. The components of the computing system 302 should be understood to have similar properties and functions as similar components in the systems 100 and 200. The computing system 302 may be a unitary device, such as a mobile phone tablet, laptop, etc. Alternatively, some of the components of the computing system 302 may be separate from other components. For example, a display such as a monitor, display, or other computing device, connected to the computing system 302 via a wired or wireless connection (e.g., Wi-Fi, Bluetooth, etc.).

The computing system 302 may receive a request to stream media 318 while connected to a first network (e.g., the network 212*a*). The request may be a user request to stream the media 114 via the first network. The request may be received via the playback module 304 and/or may be transmitted to the playback module 304 via another component of the computing system 302, such as an operating system. The request may include a desired resolution. The desired resolution may be the maximum resolution of the display or may be a preset resolution based on a predetermined setting. In some embodiments, the playback module 304 may determine a bandwidth needed to support the desired resolution via a lookup table 305. The lookup table 305 may be included in the playback module 304 (e.g., in code of a software component of the playback module 304) or may be included in memory of the computing system 302. The playback module 304 may then query a component of the computing system 302 to determine if the required bandwidth is available (e.g., the network module 104 in FIG. 1). In some embodiments, the playback module 304 may determine the available bandwidth, then determine a highest possible resolution based on the available bandwidth.

The playback module 304 may generate a buffer query 316 based at least in part on the available bandwidth and/or data included in the lookup table 305. For example, the available bandwidth may be sufficient to support display of the media 318 at 1080p. The playback module 304 may then determine that 1080p is associated with a graphics buffer of 24 MB in continuous blocks of 6 MB using the lookup table 305. The playback module 304 may then generate the buffer query 316 to indicate a graphics buffer with a buffer size of 24 MB in continuous blocks of 6 MB. In other embodiments, the buffer query 316 may include multiple buffer sizes, even if the available bandwidth may not be sufficient to support higher resolutions. For example, the playback module 304 may indicate a first buffer size corresponding to a 4K resolution, a second buffer size corresponding to a 1080p resolution, and a third buffer size corresponding to a 720p resolution. Other possibilities and configuration would be obvious to one of ordinary skill in the art.

The playback module 304 may then transmit the buffer query 316 to the hardware module 308. The buffer query 316 may be transmitted using an API or any other suitable method. The hardware module 308 may access one or more components of the computing system 302 to determine a current status of the one or more components. For example, the hardware module 308 may query the processor(s) 310 to determine the availability of the processor(s) 310 to perform tasks such as rendering the media 318, allocating memory within the RAM 312, and other such tasks.

The hardware module 308 may additionally or alternatively determine a status of the RAM 312. For example, the hardware module 308 may determine that the RAM 312 include blocks 322*a-f*. Each of the blocks 322*a-f* may include the same amount of memory or may include differing amounts of memory. For example, each of the blocks 322*a-f* may include 2 MB, 6 MB, 30 MB, etc. Each of the blocks 322*a-f* may be further divisible into other continuous blocks. For example, the block 322*b* may include 30 MB. Then, the block 322*b* may be divided to create 4 continuous blocks of up to 7 MB each. The hardware module 308 may then determine an amount of memory indicated for the graphics buffer per the buffer query 316. To do so, the hardware module 308 may determine that the blocks 322*a*, 322*c*, and 322*e-f* are unavailable. The hardware module 308 may then determine that the blocks 332*b* and 322*d* are available with an amount of memory. For example, each of the blocks 332*b* and 322*d* may include 30 MB of available memory. Thus, the hardware module 308 may determine that the RAM 312 may support a graphics buffer of 24 MB in continuous blocks of 6 MB, as indicated in the buffer query 316. The hardware module 308 may then cause at the graphics buffer to be allocated within the RAM 312. The graphics buffer may be allocated in either or both of the blocks 322*b* and 322*d*.

In embodiments where the buffer query 316 indicates multiple buffer sizes, the hardware module 308 may iteratively determine a maximum buffer size available in the RAM 312. For example, the buffer query 316 may indicate the first buffer size corresponding to a 4K resolution (e.g., 84 MB in continuous blocks of 21 MB), the second buffer size corresponding to a 1080p resolution (e.g., 24 MB in continuous blocks of 6 MB), and a third buffer size corresponding to a 720p resolution (e.g., 12 MB in continuous blocks of 3 MB). The hardware module 408 may first determine whether or not the RAM 312 includes blocks of continuous memory to support a graphics buffer according to the first buffer size. Here, the blocks 322*b* and 322*d* may each include 30 MB. Thus, the RAM 312 may not support the graphics buffer according to the first buffer size, as only two blocks of 21 MB are available. The hardware module 408 may then determine if the RAM 312 includes blocks of continuous memory to support a graphics buffer according to the second buffer size. Here, the blocks 322*b* and 322*d* may be allocated to create 4 continuous blocks of memory of 6 MB each. The hardware module 308 may therefore not determine whether the RAM 312 can support the third buffer size, as the second buffer size is already supported.

The hardware module 308 may then transmit a buffer response 320 to the playback module 304 (e.g., via the API). The buffer response 320 may indicate that the graphics buffer has been allocated in the RAM 312 according to a buffer size indicated in the buffer query 316. The buffer response may also include addresses associated with the blocks 322*b* and 322*d* (and/or subdivisions thereof). In some embodiments, the buffer response 318 may indicate that a graphics buffer has been allocated that is larger than the requested graphics buffer (e.g., that a graphics buffer sufficient to support 4K has been allocated where the request resolution is 1080p.) The playback module 304 may create an entry indicating the larger graphics buffer in the lookup table 305.

The playback module 304 may then request the media 318 at the first resolution (e.g., via a network module connected to a network). The playback module 304 may then cause the at least a portion of the media 318 (or data associated with the media 318), to become buffered data 322. The playback module 304 may cause the buffered data 322 to be stored within the graphics buffer of the RAM 312. The playback module 304 may then cause the media 318 to be displayed at the first resolution (here, 1080p). The playback module 304 may retrieve and render the buffered data 322 and/or render other data associated with the media 318. The media 318 may then be displayed on the display.

Figure 4:
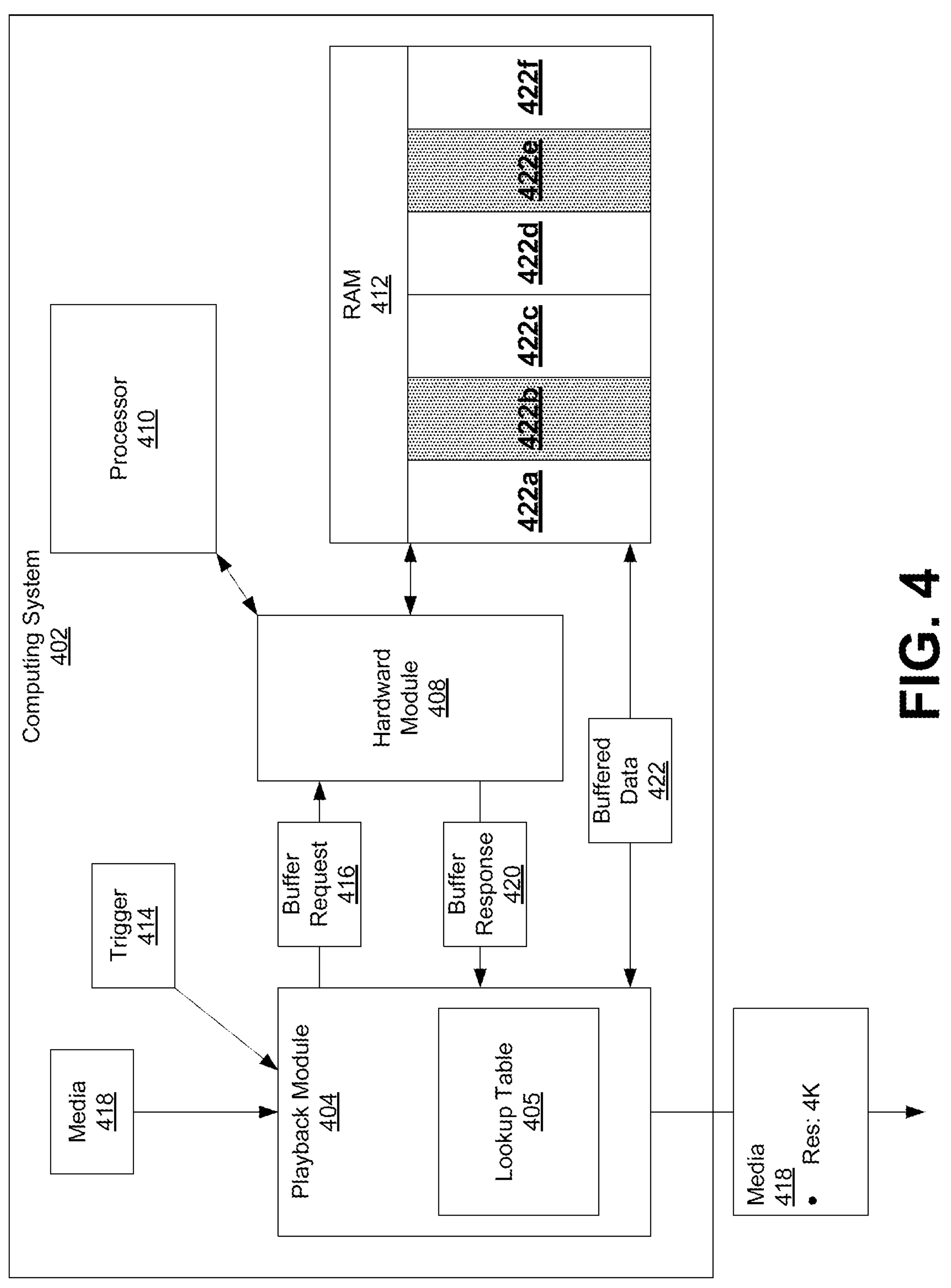
FIG. 4 illustrates system for reducing memory fragmentation during media playback, according to certain embodiments.

FIG. 4 illustrates system 400 for reducing memory fragmentation during media playback, according to certain embodiments. The system 400 may be similar to the system 300 and include similar components and functionalities. In some embodiments, the system 400 may be the same system 300, connected to a different network (e.g., the computing system 200 connecting to the networks 312*a-b*). The system 400 may also include some or all of the system 100 in FIG. 1 and/or the system 200 in FIG. 2. The system 400 may include a computing system 402. The computing system 402 may include a playback module 404, a hardware module 408, a processor(s) 410, and RAM 412. The components of the computing system 402 should be understood to have similar properties and functions as similar components in the systems 100 and 200. The computing system 402 may be a unitary device, such as a mobile phone tablet, laptop, etc. Alternatively, some of the components of the computing system 402 may be separate from other components. For example, a display such as monitor, display, or other computing device, connected to the computing system 402 via a wired or wireless connection (e.g., Wi-Fi, Bluetooth, etc.).

The computing system 402 and/or the playback module 404 may receive a trigger 414. The trigger 414 may indicate an increase in available bandwidth over a network, such as the bandwidth 213*b* in FIG. 2. The trigger 414 may indicate a user input, a change in the status of a component of the computing system 402, or any other appropriate trigger. The trigger 414 may also indicate a higher resolution. Continuing the example shown in FIG. 3, the trigger 414 may indicate a request to display media 418 at a 4K resolution, where the computing system 402 is currently displaying the media 418 at 1080p.

In response to the trigger 414, the playback module 404 may determine a highest possible resolution according to the available bandwidth (e.g., by using a lookup table 405). The playback module 404 may also determine a buffer size associated with the highest possible resolution. The playback module 404 may then generate a buffer query 416, indicating the buffer size associated with the higher resolution. For example, the available bandwidth may be sufficient to support display of the media 418 at 4K. The playback module 404 may then determine that 4K is associated with a graphics buffer of 84 MB in continuous blocks of 21 MB using the lookup table 405. The playback module 404 may then generate the buffer query 416 to indicate a graphics buffer with a buffer size of 84 MB in continuous blocks of 21 MB.

The playback module 404 may then transmit the buffer query 416 to the hardware module 408. The buffer query 416 may be transmitted using an API or any other suitable method. The hardware module 408 may access one or more components of the computing system 402 to determine a current status of the one or more components. For example, the hardware module 408 may query the processor(s) 410 to determine the availability of the processor(s) 410 to perform tasks such as rendering the media 418, allocating memory within the RAM 412, and other such tasks.

The hardware module 408 may additionally or alternatively determine a status of the RAM 412. For example, the hardware module 408 may determine that the RAM 412 includes blocks 422*a-f*. Each of the blocks 422*a-f* may include the same amount of memory or may include differing amounts of memory. For example, each of the blocks 422*a-f* may include 2 MB, 6 MB, 40 MB, etc. Each of the blocks 422*a-f* may be further divisible into other continuous blocks. For example, the block 422*a* may include 30 MB. Then, the block 422*a* may be divided to create up to 4 continuous blocks of up to 7 MB each. The block 422*a* may also be used to allocate a single continuous block of 21 MB. The hardware module 408 may then determine an amount of memory indicated for the graphics buffer per the buffer query 416. To do so, the hardware module 408 may determine that the blocks 422*b*, and 422*e* are unavailable. The hardware module 408 may then determine that the blocks 442*a*, 422*c-d*, and 422*f* are available with an amount of memory. For example, each of the blocks 442*a*, 422*c-d*, and 422*f* may include 30 MB of available memory. Thus, the hardware module 408 may determine that the RAM 412 may support a graphics buffer of 84 MB in continuous blocks of 21 MB, as indicated in the buffer query 416. The hardware module 408 may then cause at the graphics buffer to be allocated within the RAM 412. The graphics buffer may be allocated in using each of the blocks 442*a*, 422*c-d*, and 422*f*.

The hardware module 408 may then transmit a buffer response 420 to the playback module 404 (e.g., via the API). The buffer response 420 may indicate that the graphics buffer has been allocated in the RAM 412 according to a buffer size indicated in the buffer query 416. The buffer response may also include addresses associated with the blocks 442*a*, 422*c-d*, and 422*f* (and/or subdivisions thereof). In some embodiments, the hardware module 408 may determine that the RAM 412 may not support the higher resolution. Then, the buffer response 420 may indicate that the higher resolution is not supportable, and the playback module 404 may continue to display the media 418 at the first resolution (e.g., 1080p as described in FIG. 3).

If the buffer response 420 indicates that the graphics buffer may support the higher resolution, the playback module 404 may then request the media 418 at the higher resolution (e.g., via a network module connected to a network). The playback module 404 may then cause the at least a portion of the media 418 (or data associated with the media 418), to become buffered data 422. The playback module 404 may cause the buffered data 422 to be stored within the graphics buffer of the RAM 412. The playback module 404 may then cause the media 418 to be displayed at the higher resolution (here, 4K). The playback module 404 may retrieve and render the buffered data 422 and/or render other data associated with the media 418. The media 418 may then be displayed on the display.

Figure 5:
FIG. 5 illustrates a flowchart of a method for reducing memory fragmentation during media playback, according to certain embodiments.
Figure 5:
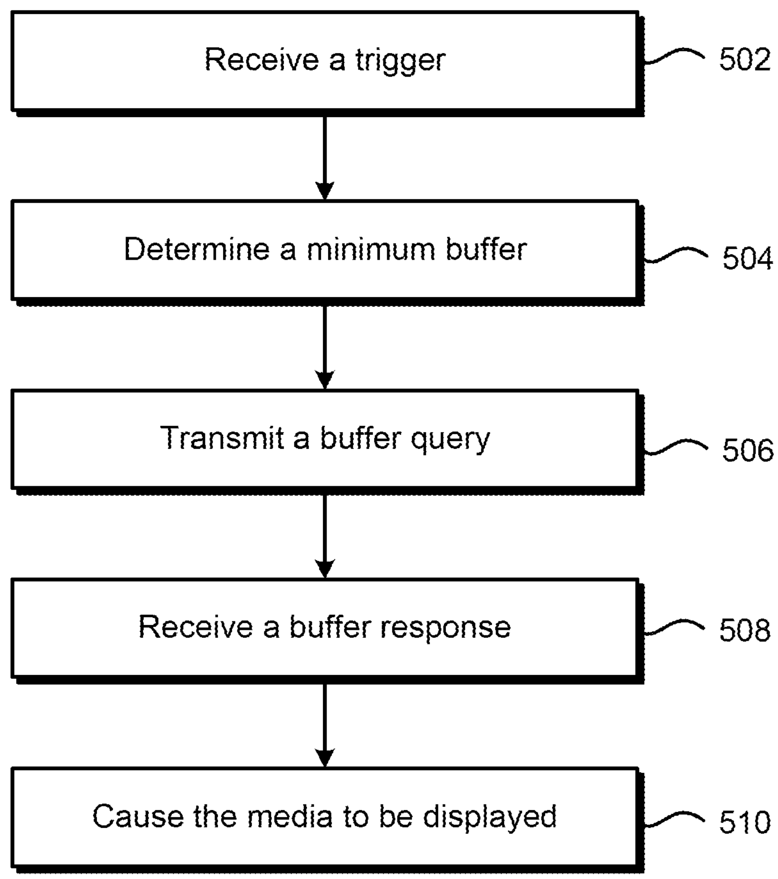

FIG. 5 illustrates a flowchart of a method 500 for reducing memory fragmentation during media playback, according to certain embodiments. The method 500 may be performed by some or all of the systems and devices described herein. For example, the method 500 may be performed by the systems 100, 200, 300, and 400, alone or in working in conjunction, in FIGS. 1-4, respectively. In some embodiments, the steps of the method 500 may be performed in a different order than is described, and/or may be combined with other steps. In some embodiments, some steps of the method 500 may be skipped altogether.

At step 502, the method 500 may include receiving, by a playback module of a computing system, a trigger to increase a resolution of media to be displayed from a first resolution to a second resolution. The computing system may be similar to the computing system 102 in FIG. 1 and/or the computing system 400 in FIG. 4. The playback module may therefore be similar to the playback module 106 and/or 404. The trigger may indicate an increase in available bandwidth over a network, such as the bandwidth 213*b* in FIG. 2. The trigger may indicate a user input, a change in the status of a component of the computing system, or any other appropriate trigger. The trigger may also indicate the second resolution. For example, the first resolution may be 720p, and the second resolution may be 4K. The computing system may be displaying the media at the first resolution, or the trigger may initiate the computing system to begin displaying the media. The playback module may determine the first resolution based on an available bandwidth, a status of one or more components of the computing system, and/or other factors.

At step 504, the method 500 may include determining, by the playback module of the computing system, a minimum buffer required to display the media at the second resolution. The playback module may determine the minimum buffer based at least in part on a lookup table such as the lookup table 405. The minimum buffer may be a total amount of memory needed in continuous blocks in order to support playback of the media at the second resolution.

At step 506, the method 500 may include transmitting, by the playback module of the computing system, a buffer query to a hardware module of the computing system. The buffer query indicates the minimum buffer. The buffer query may be similar to the buffer query 316 and/or the buffer query 416. The buffer query may be based at least in part on the available bandwidth and/or data included in the lookup table. For example, the available bandwidth may be sufficient to support display of the media at 1080p. The playback module may then determine that 1080p is associated with a graphics buffer of 24 MB in continuous blocks of 6 MB using the lookup table. The playback module may then generate the buffer query to indicate a graphics buffer with a buffer size of 24 MB in continuous blocks of 6 MB. In other embodiments, the buffer query may include multiple buffer sizes, even if the available bandwidth may not be sufficient to support higher resolutions. For example, the playback module may indicate a first buffer size corresponding to a 4K resolution, a second buffer size corresponding to a 1080p resolution, and a third buffer size corresponding to a 720p resolution. Other possibilities and configuration would be obvious to one of ordinary skill in the art.

The playback module may then transmit the buffer query to the hardware module. The buffer query may be transmitted using an API or any other suitable method. The hardware module may access one or more components of the computing system to determine a current status of the one or more components. For example, the hardware module may query a processor(s) to determine the availability of the processor(s) to perform tasks such as rendering the media, allocating memory within a RAM, and other such tasks.

At step 508, the method 500 may include receiving, by the playback module of the computing system, a buffer response from the hardware module of the computing system. The buffer response may indicate whether the minimum buffer is available. The buffer response may be similar to the buffer response 320 and/or the buffer response 320. The buffer response may also include an address associated with the minimum buffer and/or continuous blocks of memory thereof. The buffer response may also indicate that a graphics buffer has been allocated within the RAM according to the buffer query.

In response to the buffer response indicating that the minimum buffer is available At step 510, the method 500 may include causing, by the playback module of the computing system, the media to be displayed at the second resolution. The media may be displayed on a display included in the computing system or may be displayed on a connected display. The playback module may request the media at the second resolution (e.g., via a network module connected to a network). The playback module may then cause the at least a portion of the media (or data associated with the media), to become buffered data. The playback module may cause the buffered data to be stored within the graphics buffer of the RAM. The playback module may then cause the media to be displayed at the second resolution (e.g., 4K). The playback module may retrieve and render the buffered data and/or render other data associated with the media. The media may then be displayed on the display.

In some embodiments, the buffer response may indicate that the minimum buffer is not available. Then, in response to the buffer response indicating that the minimum buffer is unavailable, the method 500 may include causing, by the playback module of the computing system, the media to be displayed at the first resolution.

In some embodiments, the method 500 may include determining, by the computing system, a first bandwidth for wireless communications via a wireless network. The first bandwidth may be similar to the bandwidth 213*a* in FIG. 2. The wireless network may be a cellular network, Wi-Fi, or any other suitable network. The method 500 may then include detecting, by the computing system, an increase in the first bandwidth for wireless communications to a second bandwidth (e.g., the bandwidth 213*b* in FIG. 2). The method 500 may also include determining, by the playback module of the computing system, that the second bandwidth is above a certain threshold such that the media may be displayed at the second resolution.

Figure 6:
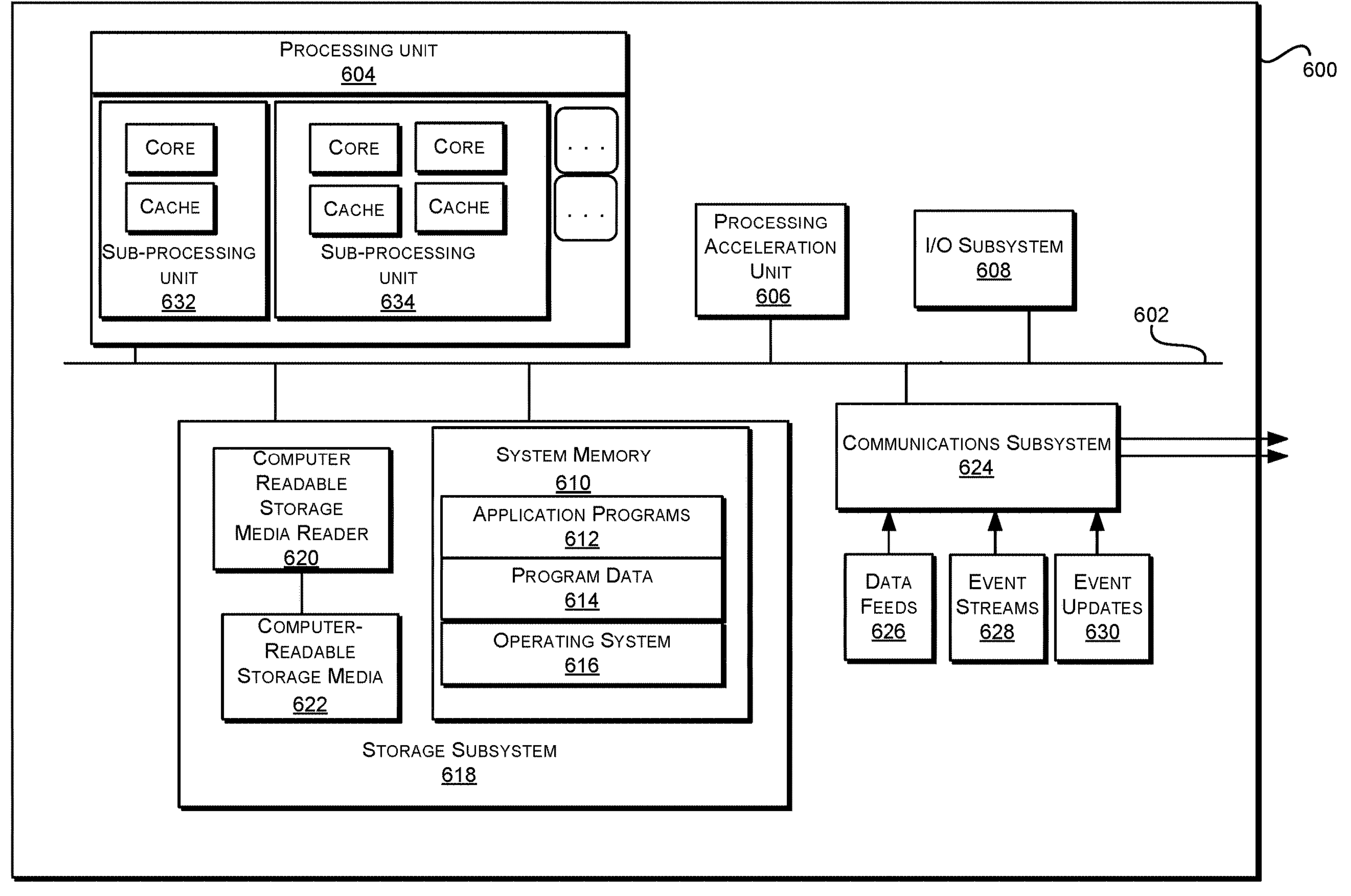
FIG. 6 illustrates an exemplary computer system 600, according to certain embodiments.

FIG. 6 illustrates an exemplary computer system 600, according to certain embodiments. The computer system 600 may be used to implement any of the methods described herein. For example, the system 600 may at least partially control a device for the playback of media and related systems to perform the method 500. As shown in the figure, computer system 600 includes a processing unit 604 that communicates with a number of peripheral subsystems via a bus subsystem 602. These peripheral subsystems may include a processing acceleration unit 606, an I/O subsystem 608, a storage subsystem 618 and a communications subsystem 624. Storage subsystem 618 includes tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 604, which can be implemented as one or more integrated circuits (e.g., a conventional microprocessor or microcontroller), controls the operation of computer system 600. One or more processors may be included in processing unit 604. These processors may include single core or multicore processors. In certain embodiments, processing unit 604 may be implemented as one or more independent processing units 632 and/or 634 with single or multicore processors included in each processing unit. In other embodiments, processing unit 604 may also be implemented as a quad-core processing unit formed by integrating two dual-core processors into a single chip.

In various embodiments, processing unit 604 can execute a variety of programs in response to program code and can maintain multiple concurrently executing programs or processes. At any given time, some or all of the program code to be executed can be resident in processor(s) 604 and/or in storage subsystem 618. Through suitable programming, processor(s) 604 can provide various functionalities described above. Computer system 600 may additionally include a processing acceleration unit 606, which can include a digital signal processor (DSP), a special-purpose processor, and/or the like.

I/O subsystem 608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices that enable users to control and interact with an input device through a natural user interface using gestures and spoken commands. Additionally, user interface input devices may include voice recognition sensing devices that enable users to interact with voice recognition systems through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader, 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 600 may comprise a storage subsystem 618 that comprises software elements, shown as being currently located within a system memory 610. System memory 610 may store program instructions that are loadable and executable on processing unit 604, as well as data generated during the execution of these programs.

Depending on the configuration and type of computer system 600, system memory 610 may be volatile (such as random access memory (RAM)) and/or non-volatile (such as read-only memory (ROM), flash memory, etc.). The RAM typically contains data and/or program modules that are immediately accessible to and/or presently being operated and executed by processing unit 604. In some implementations, system memory 610 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the ROM. By way of example, and not limitation, system memory 610 also illustrates application programs 612, which may include client applications, Web browsers, mid-tier applications, relational database management systems (RDBMS), etc., program data 614, and an operating system 616.

Storage subsystem 618 may also provide a tangible computer-readable storage medium for storing the basic programming and data constructs that provide the functionality of some embodiments. Software (programs, code modules, instructions) that when executed by a processor provide the functionality described above may be stored in storage subsystem 618. These software modules or instructions may be executed by processing unit 604. Storage subsystem 618 may also provide a repository for storing data used in accordance with some embodiments.

Storage subsystem 618 may also include a computer-readable storage media reader 620 that can further be connected to computer-readable storage media 622. Together and, optionally, in combination with system memory 610, computer-readable storage media 622 may comprehensively represent remote, local, fixed, and/or removable storage devices plus storage media for temporarily and/or more permanently containing, storing, transmitting, and retrieving computer-readable information.

Computer-readable storage media 622 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 600.

By way of example, computer-readable storage media 622 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD or other optical media. Computer-readable storage media 622 may include, but is not limited to, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to connect to one or more devices via the Internet. In some embodiments communications subsystem 624 can include radio frequency (RF) transceiver components for accessing wireless voice and/or data networks (e.g., using cellular telephone technology, advanced data network technology, such as 3G, 4G, 5G, or EDGE (enhanced data rates for global evolution), Wi-Fi (IEEE 802.4 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

In some embodiments, communications subsystem 624 may also receive input communication in the form of structured and/or unstructured data feeds 626 such as the media 118 in FIG. 1, event streams 628, event updates 630, and the like on behalf of one or more users who may use computer system 600.

By way of example, communications subsystem 624 may be configured to receive data feeds 626 in real-time from users of social networks and/or other communication services, web feeds such as Rich Site Summary (RSS) feeds, and/or real-time updates from one or more third party information sources.

Additionally, communications subsystem 624 may also be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Due to the ever-changing nature of computers and networks, the description of computer system 600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. It will be further appreciated that all testing methods described here may be based on the testing standards in use at the time of filing or those developed after filing.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words “comprise”, “comprising”, “contains”, “containing”, “include”, “including”, and “includes”, when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles “a” and “an” refer to one or to more than one (i.e., to at least one) of the grammatical object of the article. By way of example, “an element” means one element or more than one element. “About” and/or “approximately” as used herein when referring to a measurable value such as an amount, a temporal duration, and the like, encompasses variations of ±20% or ±10%, ±5%, or ±0.1% from the specified value, as such variations are appropriate to in the context of the systems, devices, circuits, methods, and other implementations described herein. “Substantially” as used herein when referring to a measurable value such as an amount, a temporal duration, a physical attribute (such as frequency), and the like, also encompasses variations of ±20% or ±10%, ±5%, or ±0.1% from the specified value, as such variations are appropriate to in the context of the systems, devices, circuits, methods, and other implementations described herein.

As used herein, including in the claims, “and” as used in a list of items prefaced by “at least one of” or “one or more of” indicates that any combination of the listed items may be used. For example, a list of “at least one of A, B, and C” includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of “at least one of A, B, and C” may also include AA, AAB, AAA, BB, etc.

What is claimed is:

1. A method comprising:

receiving, by a playback module of a computing system, a trigger to increase a resolution of media to be displayed from a first resolution to a second resolution;

determining, by the playback module of the computing system and based at least in part on a predetermined specification of an amount of memory mapped to the second resolution, a minimum buffer that corresponds to the amount of memory mapped to the second resolution, wherein the predetermined specification is a hardware specification;

transmitting, by the playback module of the computing system, a buffer query to a hardware module of the computing system, the buffer query indicating the minimum buffer;

receiving, by the playback module of the computing system, a buffer response from the hardware module of the computing system, the buffer response indicating whether the minimum buffer is available; and in response to the buffer response indicating that the minimum buffer is available, causing, by the playback module of the computing system, the media to be displayed at the second resolution.

2. The method of claim 1, further comprising:

in response to the buffer response indicating that the minimum buffer is unavailable:

causing, by the playback module of the computing system, the media to be displayed at the first resolution.

3. The method of claim 2, wherein the first resolution is at least one of 1080p or 720p, and the second resolution is 4K.

4. The method of claim 1, wherein the minimum buffer corresponds to at least one continuous block of random access memory.

5. The method of claim 1, wherein the buffer query is transmitted to the hardware module of the computing system using an application programming interface.

6. The method of claim 1, further comprising:

determining, by the computing system, a first bandwidth for wireless communications via a wireless network;

detecting, by the computing system, an increase in the first bandwidth for wireless communications to a second bandwidth; and determining, by the playback module of the computing system, that the second bandwidth is above a certain threshold such that the media may be displayed at the second resolution.

7. The method of claim 6, wherein the computing system transmits a buffer request in response to determining that the second bandwidth is above the certain threshold.

8. The method of claim 1, wherein the trigger comprises a change in bandwidth available to the computing system via a network.

9. The method of claim 1, further comprising:

in response to the buffer response indicating that the minimum buffer is available:

receiving, from the hardware module of the computing system, a location of a continuous block of memory within a computer-readable memory corresponding to the minimum buffer, and causing, by the playback module, data associated with the media to be stored in at least a portion of the continuous block of memory.

10. A system comprising:

one or more processors;

a hardware module, configured to access data indicating a status of one or more hardware components of the system;

a playback module, configured to cause media to be displayed by the system; and a non-transitory computer-readable medium comprising instructions that, when executed by the system, cause the system to perform operations to:

receive, by the playback module, a trigger to increase a resolution of media to be displayed from a first resolution to a second resolution;

determine, by the playback module and based at least in part on a predetermined specification of an amount of memory mapped to the second resolution, a minimum buffer that corresponds to the amount of memory mapped to the second resolution, wherein the predetermined specification is a hardware specification;

transmit, by the playback module, a buffer query to the hardware module, the buffer query indicating the minimum buffer;

receive, by the playback module, a buffer response from the hardware module of the system, the buffer response indicating whether the minimum buffer is available; and in response to the buffer response indicating that the minimum buffer is available, causing, by the playback module, the media to be displayed at the second resolution.

11. The system of claim 10, wherein the first resolution is at least one of 1080p or 720p, and the second resolution is 4K.

12. The system of claim 10, wherein the buffer query comprises respective buffer sizes associated with at least one of the first resolution or the second resolution.

13. The system of claim 10, wherein the first resolution is determined at least in part by an available bandwidth of a network.

14. The system of claim 10, wherein the system further performs operations to:

determine a first bandwidth for wireless communications via a wireless network;

detect an increase in the first bandwidth for wireless communications to a second bandwidth; and determine, by the playback module, that the second bandwidth is above a certain threshold such that the media may be displayed at the second resolution.

15. The system of claim 14, wherein the playback module transmits the buffer query in response to determining that the second bandwidth is above the certain threshold.

16. A non-transitory, computer-readable medium comprising instructions that, when executed by one or more processors, cause a system to perform operations comprising:

receiving, by a playback module of a computing system, a trigger to increase a resolution of media to be displayed from a first resolution to a second resolution;

determining, by the playback module of the computing system and based at least in part on a predetermined specification of an amount of memory mapped to the second resolution, a minimum buffer that corresponds to the amount of memory mapped to the second resolution, wherein the predetermined specification is a hardware specification;

transmitting, by the playback module of the computing system, a buffer query to a hardware module of the computing system, the buffer query indicating the minimum buffer;

receiving, by the playback module of the computing system, a buffer response from the hardware module of the computing system, the buffer response indicating whether the minimum buffer is available; and in response to the buffer response indicating that the minimum buffer is available:

causing, by the playback module of the computing system, the media to be displayed at the second resolution.

17. The non-transitory, computer-readable medium of claim 16, wherein the minimum buffer corresponds to a plurality of continuous blocks of random access memory.

18. The non-transitory, computer-readable medium of claim 16, wherein the buffer query is transmitted to the hardware module of the computing system using an application programming interface.

19. The non-transitory, computer-readable medium of claim 16, further comprising:

determining, by the computing system, a first bandwidth for wireless communications via a wireless network;

detecting, by the computing system, an increase in the first bandwidth for wireless communications to a second bandwidth; and determining, by the playback module of the computing system, that the second bandwidth is above a certain threshold such that the media may be displayed at the second resolution.

20. The non-transitory, computer-readable medium of claim 16, further comprising:

in response to the buffer response indicating that the minimum buffer is available:

receiving, from the hardware module of the computing system, a location of a continuous block of memory within a computer-readable memory corresponding to the minimum buffer, causing, by the playback module, data associated with the media to be stored in at least a portion of the continuous block of memory.

* * * * *